United States Patent
Barenbrug et al.

(10) Patent No.: US 7,525,553 B2
(45) Date of Patent: Apr. 28, 2009

(54) COMPUTER GRAPHICS PROCESSOR AND METHOD FOR GENERATING A COMPUTER GRAPHICS IMAGE

(75) Inventors: Bart Gerard Bernard Barenbrug, Eindhoven (NL); Kornelis Meinds, Eindhoven (NL)

(73) Assignee: NXP B.V., Eindhoven (NL)

( * ) Notice: Subject to any disclaimer, the term of this patent is extended or adjusted under 35 U.S.C. 154(b) by 499 days.

(21) Appl. No.: 10/552,800

(22) PCT Filed: Apr. 13, 2004

(86) PCT No.: PCT/IB2004/050422

§ 371 (c)(1), (2), (4) Date: Oct. 11, 2005

(87) PCT Pub. No.: WO2004/093010

PCT Pub. Date: Oct. 28, 2004

(65) Prior Publication Data

US 2006/0232596 A1    Oct. 19, 2006

(30) Foreign Application Priority Data

Apr. 15, 2003   (EP) .................. 03076102

(51) Int. Cl.
  *G09G 5/00*   (2006.01)
  *G06T 15/10*  (2006.01)
(52) U.S. Cl. .............. 345/619; 345/582; 345/589; 345/427
(58) Field of Classification Search .......... 345/619, 345/589, 582, 427, 418
See application file for complete search history.

(56) References Cited

U.S. PATENT DOCUMENTS

| | | | | |
|---|---|---|---|---|
| 5,179,638 A | * | 1/1993 | Dawson et al. | 345/582 |
| 5,977,977 A | * | 11/1999 | Kajiya et al. | 345/418 |
| 6,232,981 B1 | * | 5/2001 | Gossett | 345/582 |
| 6,937,250 B1 | * | 8/2005 | Schilling et al. | 345/582 |
| 2006/0158451 A1 | * | 7/2006 | Barenbrug et al. | 345/582 |
| 2006/0232598 A1 | * | 10/2006 | Barenbrug et al. | 345/582 |

* cited by examiner

*Primary Examiner*—Chante Harrison
(74) *Attorney, Agent, or Firm*—Aaron Waxler (57) ABSTRACT

A computer graphics processor is described comprising a model information providing unit (210) for providing information representing a set of graphics primitives, a rasterizer (227) capable of generating a first sequence of coordinates which coincide with a base grid associated with the primitive, a color generator (235) for assigning a color to said first sequence of coordinates, and a display space resampler (245) for resampling the color assigned by the color generator in the base grid for coordinates u,v to a representation in a grid associated with a display with coordinates x,y, in a first and a second transformation. The transformation is carried out in a first and a second pass, and optionally includes a transposition. The order of the passes and the decision to apply a transposition or not is based on an evaluation of the partial derivatives formula (I) two of which determine shear and two of which determine scaling in the transformations. The option is selected wherein relatively large derivatives occur as scale factors, and relatively small derivatives occur as shear factors and wherein the lowest amount of shear occurs during the second transformation.

6 Claims, 5 Drawing Sheets

COMPUTER GRAPHICS PROCESSOR AND METHOD FOR GENERATING A COMPUTER GRAPHICS IMAGE

The invention relates to a computer graphics processor.

The invention further relates to a method for generating a computer graphics image.

Rendering computer generated images is done using many different techniques for many different purposes. High volume consumer level products are based on screen-space scan-line algorithms which render primitives one by one by traversing the pixels on the screen to which the primitive projects. Inverse texture mapping is used to determine the color that a primitive contributes to such a pixel. With some modifications[8] in the later stages (rasterization and beyond) of such a graphics pipeline, forward texture mapping can be used as well. With forward texture mapping, the projection of the primitive on the texture map is traversed, rather than the projection on the screen, and the texture samples (texels) which are encountered are mapped and splatted onto the screen. This mapping involves a 2D transformation It is known that 2D filtering can be approximated using two 1D filter passes for a large class of filters, providing more efficient solutions. See for example [2,17]

As described therein, such separation can exhibit so-called bottleneck and shear problems, resulting in blurriness and aliasing respectively. In order to moderate the consequence of these disadvantageous effects these publications describe four traversal orders. One of these is chosen to reduce the bottleneck problem. As a solution to shear aliasing, supersampling is described in the known literature. Supersampling requires an extra downscale filter to reduce the extra resolution to the required output resolution.

It is a purpose of the present invention to provide a computer graphics processor and method for generating a computer graphics image wherein such an extra downscale filter is superfluous. A computer graphics processor of the invention in accordance with this purpose is claimed in claim 1. A method for generating a computer graphics image of the invention in accordance with this purpose is claimed in claim 6. In the computer graphics processor according to the invention the model information providing unit provides information representing a set of graphics primitives, such as triangles or other polygons, or Bezier shapes. The information provided may comprise geometrical information defining a shape of the primitives and/or appearance information defining an appearance of the primitives, such as texture and color information.

The rasterizer is capable of generating a first sequence of coordinates which coincide with a base grid u,v associated with the primitive, and is further capable of generating one or more sequences of interpolated values associated with the first sequence. The further sequence may include screen (display) coordinates x,y and for example includes normal information for the surface represented by the primitive.

The color generator is arranged for assigning a color to said first sequence of coordinates using said appearance information. The color generator may simply use an interpolated color provided by the rasterizer, but may also perform complicated shading and texturing operations. The display space resampler is arranged for resampling the color assigned by the color generator in the base grid for coordinates u,v to a representation in a grid associated with a display with coordinates x,y. The transformation is carried out in a first and a second transformation as this substantially reduces computational effort.

The display space resampler uses a transposing facility and a selection facility for selecting from four options depending on whether the image data is transposed or not, and depending on the order wherein the first and the second transformation are applied, i.e. whether first the x or the y coordinate of the display coordinates is calculated. This computer graphics processor and the method according to the invention include a new selection criterion to choose between the four alternatives, which also takes shear into account. It was recognized by the inventors that the second pass filter can act as downsample filter for any supersampling performed in the first pass, while supersampling in the second pass would require an extra downsample filter (a third pass). Therefore, after a first selection step to reduce bottleneck, wherein it is determined whether a transposition should be applied or not, a choice between the remaining two options is made on the shear occurring in the two passes (transformations).

A transposition is intended to include transformations wherein the coordinates in a coordinate pair are interchanged. This is for example achieved by mirroring the coordinates around a line x=y or a line x=−y. The same effect is achieved by a forward or a backward rotation over 90°. In this case however, the second transposition should involve forward rotation if the first tranposition is a backward rotation and vice versa.

The selected option is the one wherein the least amount of shear occurs in the second pass, so that the need for supersampling in the second pass is avoided. Instead, the worst shear is put in the first pass where shear aliasing can easily be reduced by using supersampling.

More in particular four options can be defined as follows.

a first option where:

in a first pass, uv image data is resampled into xv image data by mapping u to x for each line having coordinate v, and in a second pass the xv image data is transformed into xy image data by mapping v to y for each line having coordinate x, a second option where in a first pass, uv image data is resampled into uy image data by mapping v to y for each line having coordinate u, and in a second pass the uy image data is transformed into xy image data by mapping u to x for each line having coordinate y, a third option where in a first pass, uv image data is transformed into yv image data by mapping u to y for each line having coordinate v, in a second pass the yv image data is transformed into yx image data by mapping v to x for each line having coordinate y, and the yx image data is transposed to xy image data, a fourth option where in a first pass, uv image data is transformed into ux image data by mapping v to x for each line having coordinate u, in a second pass the ux image data is transformed into yx image data by mapping u to y for each line having coordinate x, and the yx image data is transposed to xy image data In the third and the fourth option an explicit transposition of the coordinates generated by the rasterizer is not necessary. Instead the coordinates of the vertices and/or control points defining the primitives can simply be transposed before generating the coordinates of the base grid.

These and other aspects of the invention are described in more detail with reference to the drawings. Therein.

In these Figures parts corresponding to each other have a reference number which differs by 100 or a multiple thereof.

Figure 1:
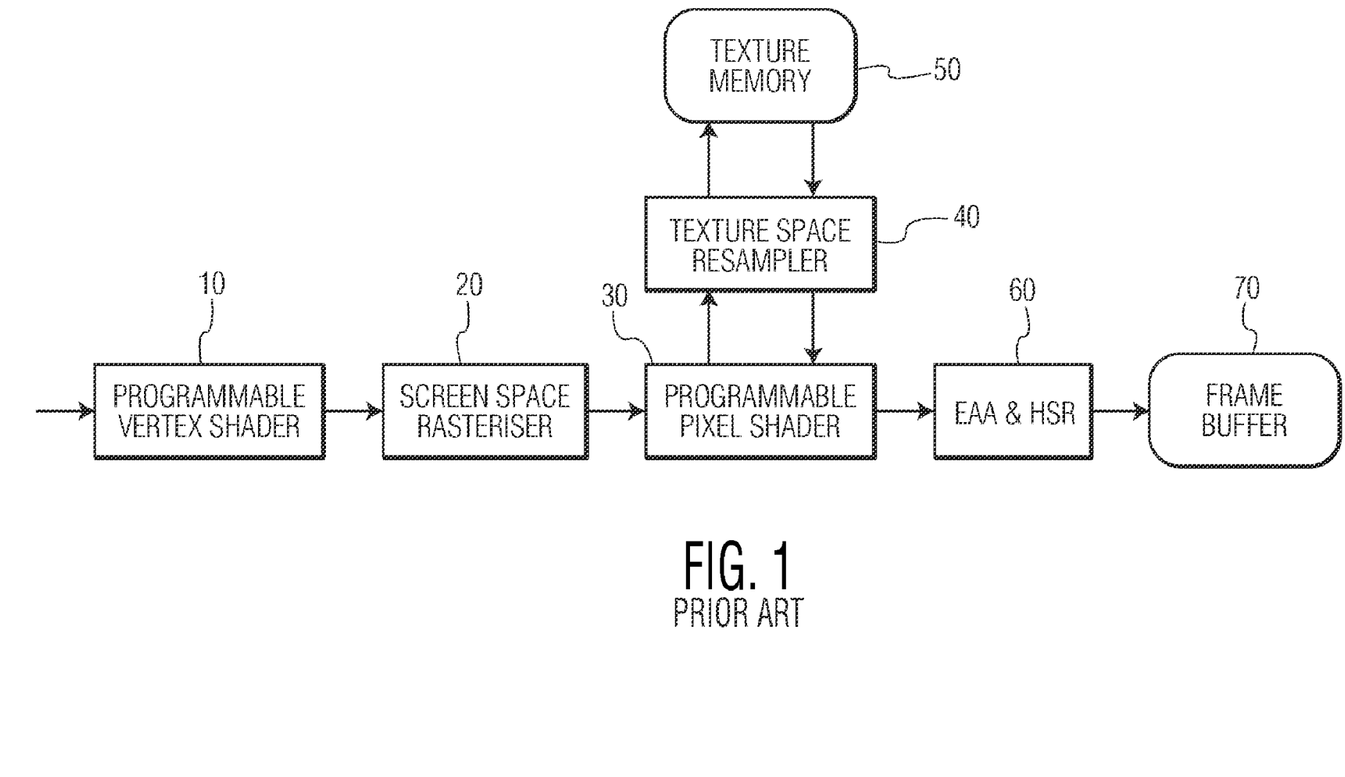
FIG. 1 shows a known architecture of a computer graphics processor.

FIG. 1 shows the architecture of the last stages of a graphics pipeline featuring programmable vertex and pixel shading. The programmable vertex shader 10 (together with the frame buffer 70 at the end of the pipeline) provides the context of the changes to the architecture which are described with reference to FIGS. 2 ff. The vertex shader[6] can modify and setup data for the pixel shader 30 for each vertex of a primitive that is to be rendered. The data provided by the vertex shader 10 to the rasterizer 20 (for interpolation) usually includes attributes like diffuse and/or specular color, texture coordinates, (homogeneous) screen coordinates, and sometimes extra data like surface normals or other data required for the shading process.

These attributes are offered to the screen-space rasterizer 20 which uses a scanline algorithm to traverse the pixels which lie within the projection of the primitive on the screen, by selecting the screen coordinates from the vertex attributes as driving variables for the rasterization process. The rasterizer 20 interpolates the attributes to provide values for each of the pixels visited. Interpolation accounts for the perspective mapping from world space to screen space. The attributes are then available at each pixel location, where a pixel shader[11, 12, 13] can use them to compute the local surface color. When texture data is needed, the texture space resampler 40 is used to obtain a texture sample from the texture memory 50 given the texture coordinates. These texture coordinates are generated by the pixel shader 30 based on the interpolated coordinates received from the rasterizer 20 and any results from previous texture fetches (so-called dependent texturing) and/or calculations. The texture filter operation is usually based on bilinear or tri-linear interpolation of nearby texels, or combinations of such texture probes to approximate an anisotropic perspectively transformed) filter footprint.

After the surface color for a pixel has been determined, the resulting pixel fragment is sent onwards to the Edge Anti-Aliasing and Hidden Surface Removal (EAA & HSR) unit 60. Usually, this unit uses a Z-buffer for hidden surface removal and multi-sampling (with the associated sub-sample buffer and downsample logic) for edge anti-aliasing. Downsampling is applied when all primitives have been rendered using a (usually box) prefilter to combine sub-samples to colours at the final pixel resolution.

An important issue when rendering high-fidelity pictures is anti-aliasing (both texture anti-aliasing and edge antialiasing). Current super-sampling and multi-sampling techniques are computationally intensive and require a lot of memory bandwidth. In a graphics pipeline architecture using forward texture mapping, prefiltering can easily be used to avoid aliasing artifacts [8,9,2]. Such a forward texture mapping architecture, is depicted in FIG. 2.

Figure 2:
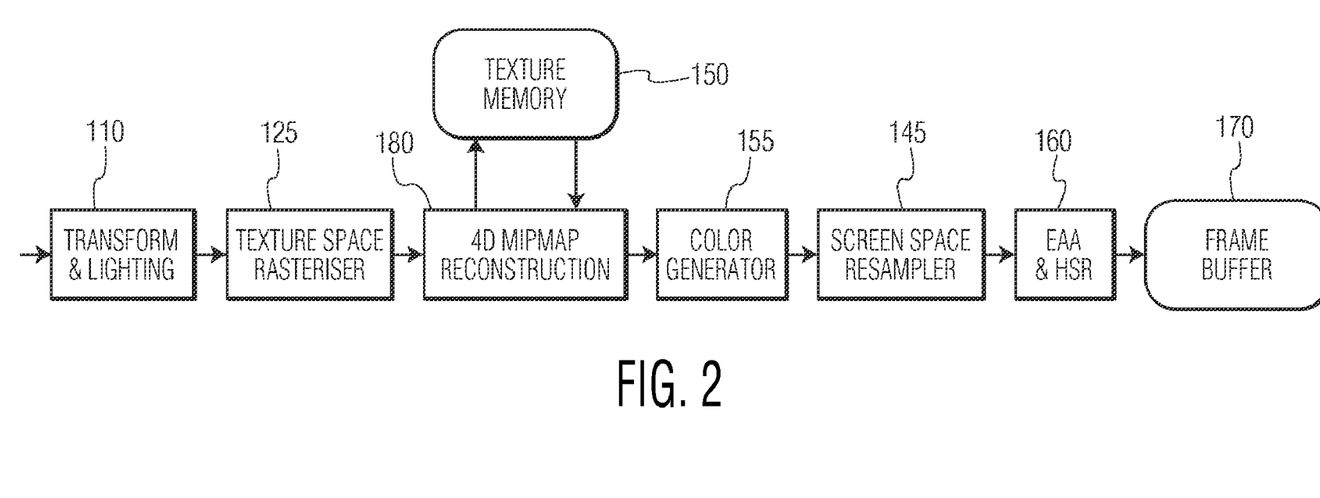
FIG. 2 shows a first architecture of a computer graphics processor suitable for implementation of the present invention.

As in the traditional pipeline, of FIG. 1, the computer graphics processor shown in FIG. 2 comprises a model information providing unit 110 also denoted as programmble vertex shader or transformation and lighting unit, for providing information representing a set of graphics primitives. It also comprises a rasterizer 125 capable of generating a first sequence of coordinates which coincide with a base grid associated with the primitive.

Unlike the traditional screen space rasterizer 20, the texture space rasterizer 125 traverses the projection of the primitive onto the texture map (rather than the screen), by selecting the texture coordinates (instead of screen coordinates) as the driving variables for the rasterization process. All attributes are interpolated (linearly, except for the screen coordinates to which a texel is projected, which are interpolated perspectively). The texture space rasterizer 125 traverses the texture map for example on a grid corresponding to 4D mipmapping (for more details on 4D mipmaps, see Heckbert's survey of texture mapping[4]). A texture fetch then amounts to 4D mipmap reconstruction from the 3D mipmap data stored in the texture memory 150. Alternatively the texture may be stored uncompressed in the memory 150, or may be generated on the fly.

The computer graphics processor further comprises a color generator 155 for assigning a color to said first sequence of coordinates. Therein a fetched texel can be combined with interpolated diffuse and/or specular color resulting in a color sample of the surface with associated (generally non-integer) screen coordinates which indicate where this texture sample is mapped to on screen.

A display space resampler 145 resamples the color assigned by the color generator in the base grid for coordinates u,v to a representation in a grid associated with a display with coordinates x,y.

The pixel fragments coming from the screen space resampler 145 are then combined in the EAA & HSR unit 160, which uses a fragment buffer[8]. Pixel fragments are depth-sorted into this buffer to solve the hidden surface problem. After all primitives have been rendered, all visible fragments for each pixel are combined (which mostly amounts to simple summation since the screen space resampler 145 delivers colours already weighted by the prefilter) and sent to the frame buffer 170. Edge anti-aliasing results from combining the partial contributions generated by the screen space resampler 145 near the edges, resulting in a final pixel color which is a combination of colours from different primitives. Techniques used in the A-buffer[1], the Z3 buffer[5] or the WarpEngine[14] could be used in the EAA & HSR unit, although the fragment buffer described in the paper from Meinds[8] differs from these in that it considers the colours in the buffer from one pixel as partial contributions to the whole filter footprint of that pixel (possibly partially behind one another) instead of colours for a certain position on a super-sample grid (which are always next to each other).

The shaded color sample resulting from the pixel shading process is forwarded to the screen space resampler 145 along with its screen coordinates. The screen space resampler 145 resamples the color samples, (located generally at noninteger pixel positions) to the integer pixel positions needed for display. In other words the screen space resampler splats mapped texels to integer screen positions, providing the image of the primitive on the screen. The 2D resampling operations can efficiently [2] be executed in a first and a second 1D transformation, for example using 1D FIR filter structures, and optionally including a transposition.

Possible implementations of the model information providing unit, the rasterizer and the color generator are described in the European patent application 03100313.0 filed 13FEB2003 by the same inventors According to the invention the processor has a selection facility for selecting the order of the transformations and selecting whether to apply a transposition or not based on an evaluation of the partial derivatives $\partial x/\partial u$, $\partial x/\partial v$, $\partial y/\partial u$, $\partial y/\partial v$, two of which determine shear and two of which determine scaling in the transformations, the selection being made wherein relatively large derivatives occur as scale factors, and relatively small derivatives occur as shear factors and wherein the lowest amount of shear occurs during the second transformation. This selection is further elucidated as follows.

Figure 5:
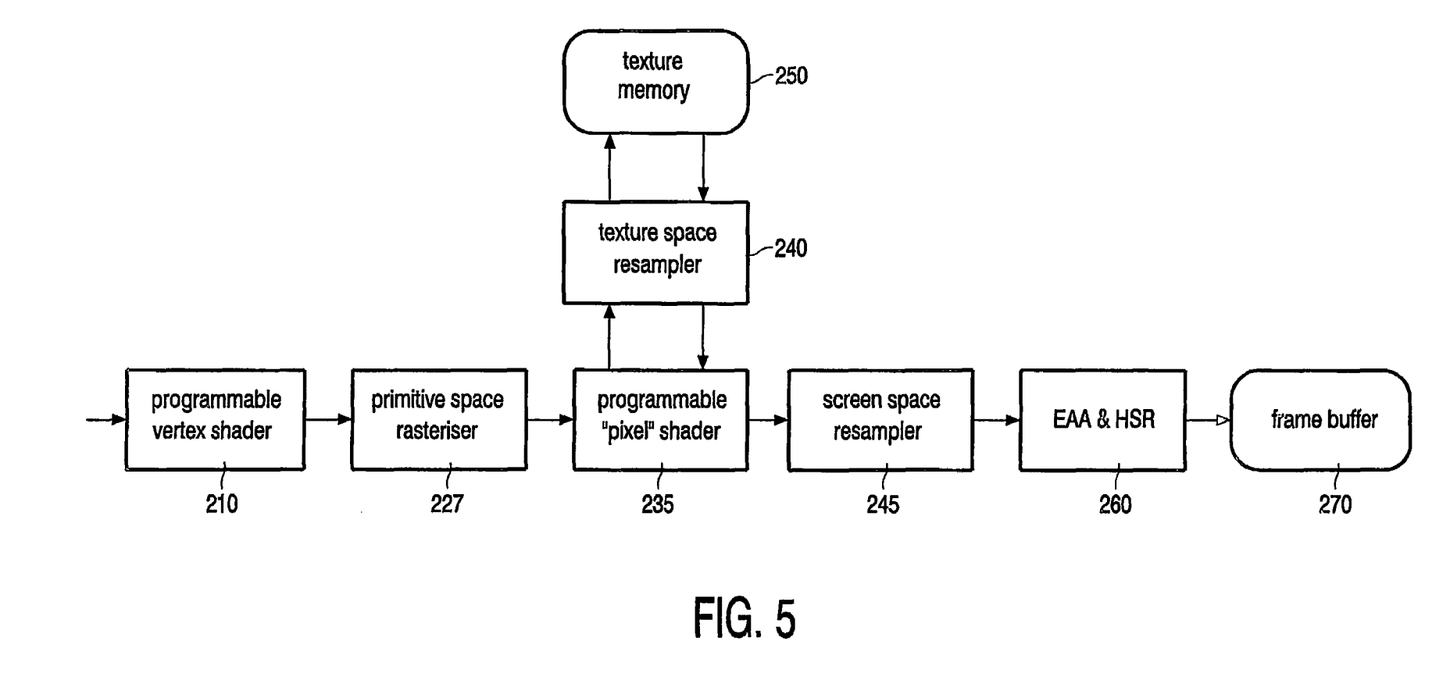
FIG. 5 shows a second architecture of a computer graphics processor suitable for implementation of the present invention.

If the screen space resampler 245 is implemented using 2-pass filtering, the rasterizer 227 has to prepare for this in addition to the setup required for primitive surface traversal. Two-pass filtering is known to suffer from bottleneck and shear problems [17, 15, 2].

Figure 3:
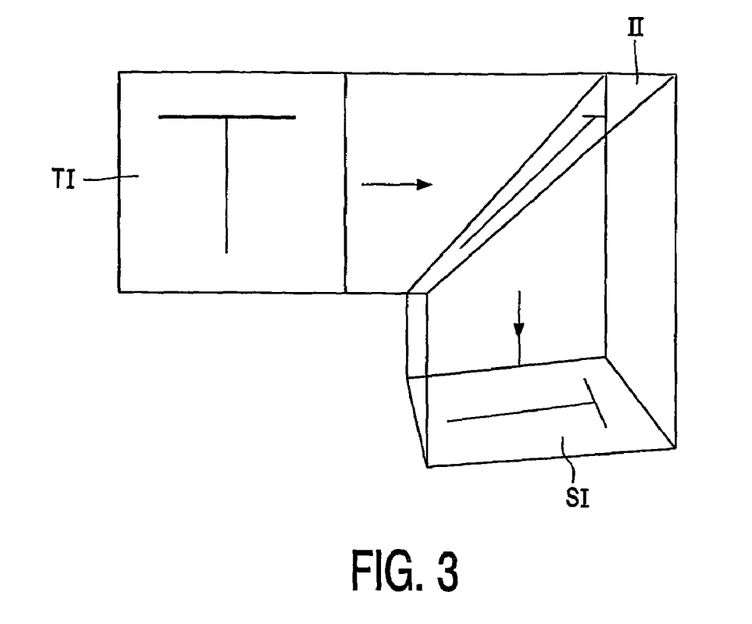
FIG. 3 illustrates a first problem encountered with a two-stage image transformation.

The bottleneck problem is illustrated in FIG. 3 where the area of the intermediate image II becomes very small relative to the input and output images TI, SI. It occurs with rotations close to 90°, and results in excessive blur in the direction of the second pass (since the second pass has to magnify the collapsed intermediate image again).

Figure 4:
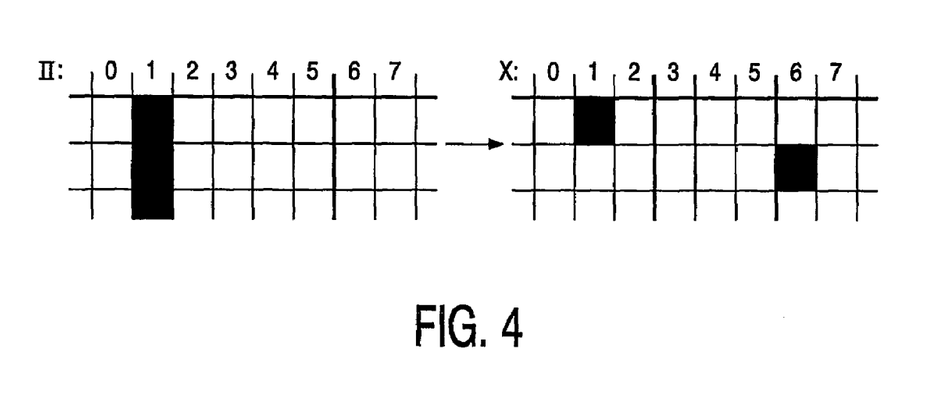
FIG. 4 illustrates a second problem encountered with a two-stage image transformation.

The shear problem is illustrated in FIG. 4 where two lines of a texture map TI and intermediate image II are shown. The texture map TI has a black vertical line, and the shear of the perspective mapping is such that the black pixel on the second line ends up five pixels more to the right than the black pixel on the first line. The horizontal filter pass prevents horizontal aliasing, but not vertical aliasing. The shear causes a very sharp transition between black pixels on one line, and white pixels on the next. Also, the line in the intermediate image II consists of disjunct parts, separated by columns to which the line does not contribute (e.g. for x=3). A solution[17] to the shear problem is to rasterize at a finer resolution, causing extra intermediate lines to be generated, with a black pixel at intermediate positions filling the holes. If this is done for first pass shear, the second pass will downscale the larger intermediate image to its final resolution. If shear in the second pass would be treated using the same super-sampling approach, a third pass would be needed to reduce the generated higher horizontal resolution to the output resolution.

Much like in the paper by Catmull and Smith[2], the present invention avoids the bottleneck problem by choosing between the four options obtained by deciding (1) to generate the output image SI straight away, or generate a transposed version and transpose the generated image, and (2) doing the horizontal pass first, or doing the vertical pass first.

According to the present invention however, different criteria are used to choose between these options to minimize shear in the second pass. In this way, it is not necessary to generate extra image columns to counter shear in the second pass. In the worst case it is only necessary to generate intermediate lines to counter shear aliasing in the first pass. This avoids having the penalty of a third pass. Consider a local linearization of the mapping around some point p:

$$\begin{pmatrix} x - x_p \\ y - y_p \end{pmatrix} = \begin{pmatrix} \frac{\partial x}{\partial u} & \frac{\partial x}{\partial v} \\ \frac{\partial y}{\partial u} & \frac{\partial y}{\partial v} \end{pmatrix} \begin{pmatrix} u - u_p \\ v - v_p \end{pmatrix}$$

The derivatives used there are good indicators for the bottleneck and shear problems (at point p): for the case where in the first pass u is mapped to x and in the second pass v to y, $\partial x/\partial u$ is the scale factor for the first pass: if this is small (close to zero), the intermediate image will collapse and exhibit the bottleneck problem. $\partial y/\partial v$ is the scale factor for the second pass, and $\partial x/\partial v$ and $\partial y/\partial u$ are the amounts of shear for the first and second pass respectively. Each of the four derivatives is in the role of first pass scale factor for one of the four options for combating the bottleneck problem. Choosing the option which corresponds to the largest first pass scale factor (thereby maximizing the intermediate image area[2] reduces the bottleneck problem, but may leave shear in the second pass rather than in the first. According to the present invention shear is taken into consideration, by selecting between the four options in two stages.

First it is decided how to pair up the coordinates: map u to x and v to y, or map u to y and v to x. This is based on a determination of the derivatives at the primitives vertices and the amount of correlation between u and v on the one hand and x and y on the other hand. The coordinates are paired by selecting the two derivatives that correlate the strongest as scale factors. The other two become shear factors. This amounts to the "transpose or not" choice from Catmull and Smith.

Second, the order of the passes is chosen. Swapping the order of the passes puts the first pass scale and shear factors in the second pass, and vice versa. The order is chosen that results in the least amount of shear in the second pass. This choice also determines which of the two scale factors will be the one for the first pass, and which one will be the scale factor for the second pass. This may yield a sub-optimal choice as far as the bottleneck problem is concerned, but since the first criterion selects strongly correlated coordinates as scale factors, both scale factors are usually large enough to avoid the bottleneck problem. So this selection process provides a good compromise between avoiding bottleneck and second pass shear problems.

Pixel shading often amounts to combining several textures in one way or another. This can easily be done in a traditional architecture as shown in FIG. 1, since the texture space resampler 40 resamples all textures to the common screen pixel grid, where the texture samples for each pixel can be combined.

In the forward texture mapping architecture as described with reference to FIG. 2, texture samples are only available on the common screen pixel grid after the screen space resampler stage 145. Also, a rasterizer can only traverse one grid at a time, so when rasterization is taking place on a texture grid as in the forward mapping architecture and multi-texturing is enabled, the rasterizer has to select one texture out of many, and traverse the primitive on the associated grid. Multiple textures can be handled in a multi-pass fashion, so that they can be combined after they are resampled to the screen pixel grid. But that congests the fragment buffer in the EAA & HSR unit 160. It also precludes advanced features such as dependent texturing, or texture modes which are of an inverse nature, such as environment mapped bump mapping (where the bump map information at each grid position determines where the environment map is indexed, possibly resulting in a one-to-many forward mapping from environment map to the primitive surface and the screen).

These problems can be avoided if the screen space resampler can map texture samples as if there was only one texture map associated with the primitive. To this end, shading of the surface color should be performed before the screen space resampling process. This is depicted in FIG. 5 which shows a hybrid graphics pipeline.

In this hybrid pipeline, the rasterizer rasterizes the primitive over a "surface grid", i.e. over a grid in a coordinate system that provides a 2D parameterization of the surface of the primitive. The grid associated with a texture map provides such a surface grid, and is preferably used as surface grid (since obtaining texture samples on a texture grid does not require resampling). But in case of absence of texture maps, or when for example textures are 1D or 3D, another grid may be chosen. This is described in more detail in a further section. Attributes can be linearly interpolated over this grid, except (as in the case of forward texture mapping) for the perspectively mapped screen coordinates associated with each grid position.

The rasterizer 227 interpolates attributes (including secondary texture coordinates) to the positions on this grid. The pixel shader 235 then operates on the attributes on grid positions in this surface grid and if there are any secondary textures associated with the primitive, it uses inverse mapping with standard texture space resamplers to obtain colors from these textures. If the surface grid was selected from a texture map, fetching texels for this "primary" texture stage boils down to the 4D mipmap reconstruction process from the forward mapping pipeline. This process is a form of axis-aligned anisotropic filtering, and anisotropic filtering is often available in standard texture space resamplers. The fetched texture samples and other attributes can be used by the pixel shader program to compute the surface color for the current grid position.

Once the sample on the surface grid has been shaded, the screen space resampler 245 is used to splat the color to the screen pixels, where an EAA & HSR unit 260 can combine contributions from different primitives.

Using the hybrid architecture as shown in FIG. 5 has several consequences and enables several attractive features. These will be discussed here for the different stages of the hybrid pipeline along with some discussion of changes to these stages with respect to the traditional pipeline shown in FIG. 1.

The rasterizer 227 will have to choose a primitive grid, avoid bottleneck and shear problems, and control mipmapping. The programmable pixel shader 230 and texture space resamplers 240 remain the same as in a traditional pixel shading pipeline, and there are some options for the screen space resampler 245.

The surface space rasterizer 227 will contain an extra first pipeline stage (next to the regular setup and traversal stages) in which the surface grid is chosen. This is done before the regular rasterizer setup. Preferably, the surface grid is derived from one of the texture maps, so that this texture map does not have to be resampled (apart from an optional 4D mipmapping) by the texture space resampler 240. To this end, the grid setup stage can examine the texture maps which are associated with the primitive. For a texture map to be eligible to provide the surface grid, it has to fulfill three requirements. First, it must not be addressed dependently. Second, it has to be a 2D texture (1D and 3D textures are not suitable for traversing a 2D surface). Third, the texture coordinates at the vertices should not make up a degenerate primitive (where for example all the texture coordinates line up, yielding in effect a 1D texture).

If more than one textures are eligible, the texture is selected with the largest area in texture space: this is the texture with potentially the most detail and highest frequencies (so best to avoid the texture space resampling process for this texture, since this process can give rise to unneeded blur and aliasing).

If there is no eligible texture available (in case of a simple Gouraud shaded primitive for example), a dummy grid over the surface of the primitive can be chosen for the rasterizer 227 to traverse, by assigning dummy "texture coordinates" to each vertex. This dummy grid is then traversed by the rasterizer as if it were a texture grid (except that texture fetching for these coordinates is disabled). An advantage is that the resulting linear interpolation over the surface provides for perspective correct Gouraud shading, as noted by Chen[3]. Assigning the x and y screen coordinates of each vertex as dummy texture coordinates is an option. Note that this choice does not mean that the rasterizer traverses screen pixels, since the homogeneous w for each vertex is still taken into account when mapping a 'texel' to the screen. Another option (for planar surfaces such as triangles) is rotating the 3D vertex coordinates in eye space, such that the normal of the rotated surface aligns with the eye space z-axis, and then selecting the rotated eye space x and y coordinates as dummy grid coordinates for each vertex.

The ability to traverse any grid over the surface of the primitive provides a lot of freedom. This freedom could be used for example to avoid any bottleneck and shear problems which might be associated with the mapping of a particular texture grid to the screen. It could be used to traverse non-planar primitives (such as traversing a Bezier patch via the 2D grid determined by its surface parameterization, and using the forward mapping to directly splat the surface colors to the screen). It could also be used to rasterizer in the direction of the motion of the primitive so that a 1D filter can be applied along the rasterization direction to efficiently implement motion blur[7].

The rasterizer 227 must sample the surface of the primitive at a resolution suitable for the resolution of its projected screen image SI. To this end, the grid is traversed in a way similar to mipmapping in a traditional pipeline. When more or less detail is required, the rasterizer can change mipmap level by shifting the delta values used to increment the grid coordinates and the interpolated attributes. In this way, the rasterizer takes larger or smaller steps over the surface grid.

The rasterizer 227 maintains the screen coordinates associated to each grid position via the perspective mapping. Using these, it can determine whether a mipmap switch is in order by making sure that the difference between the screen coordinates of subsequent grid positions remains within a suitable range (between and 1 for example, though a mipmap level bias can be employed of course)

The above-mentioned process does not directly provide the mipmap level to be used for fetching samples from any associated texture map, as it only ensures a proper surface-to-screen mipmap level. For each texture map, there is also a scaling factor associated with the mapping from the texture grid to the surface grid. This scaling factor corresponds to a texture-to-surface mipmap level which can be added to the surface-to-screen mipmap level to arrive at the required overall texture-to-screen mipmap level.

The texture-to-surface mipmap level can directly be obtained from the delta values used to interpolate the texture coordinates over the surface of the primitive, and since this interpolation is linear, the texture-to-surface mipmap level is constant per primitive and can be stored by the rasterizer setup in a register associated to each texture resampling stage for use as an offset.

The programmable "pixel" shader 230 and texture space resampler 240 (of which there may be one or more, for serial or parallel fetching of texture samples) are exactly the same as those in a traditional pipeline. The pixel shader 230 receives a set of (interpolated) attributes, including texture and screen coordinates, for one location. The texture coordinates, along with the shading program, determine where to index the texture maps via the texture space resampler 240. The shader 230 can also modify texture coordinates before sending them to the texture space resampler 240 to implement dependent texturing, exactly in the same way as in a traditional pipeline.

The programmable shader 230 passes the shaded color on to the screen space resampler 245, along with the associated screen coordinates, which are in general not integer. This can be handled in a similar way as is done by a pixel shader 30 in a traditional pixel shader pipeline (FIG. 1), which may receive sub-pixel screen positions when performing supersampling. The shaded color is the result of computations for one location, and does not depend on the grid traversed by the rasterizer 227. This means that existing shader programs will not have to be modified to run on the proposed architecture.

There are advantages and disadvantages to performing the programmable shading in surface space. Next to the high quality anti-aliasing enabled by the forward mapping, a main advantage is that the texture space resampler 240 does not have to deal with the perspective mapping to the screen.

Most of the time it will be used to perform an affine transformation from texture grid to another. Standard bilinear/trilinear probe based texture space resamplers can better approximate the filter footprints required for such an affine mapping than the more general shaped footprints required for perspective mapping, so the quality from this resampling process will be higher. Only the screen space resampler 245 has to deal with the perspective resampling, and it is only applied to shaded samples on the surface grid once.

A disadvantage is that more samples are shaded than in a traditional pixel shading pipeline. This is due to mipmapping maintaining a minification factor between 1 and 2 in each direction (so roughly 1.5×1.5 surface elements are sampled per pixel). The high-quality anti-aliasing will however make sure that sub-pixel details still contribute to the final image, thereby further improving image quality.

Another disadvantage can be that secondary textures are now resampled twice (once by the texture space resampler 240 and again by the screen space resampler 245), which might introduce extra blurriness. By selecting the texture map with the highest detail as primary texture, it is ensured that the finest details are only resampled once. The secondary textures will have a smaller minification (or even magnification, as is usually the case with for example light maps) for which some extra blur is not very noticeable. The screen space resampler 245 also enables the use for high quality sharpness enhancement filters, which can also help with maintaining a sharp image.

Figure 6A:
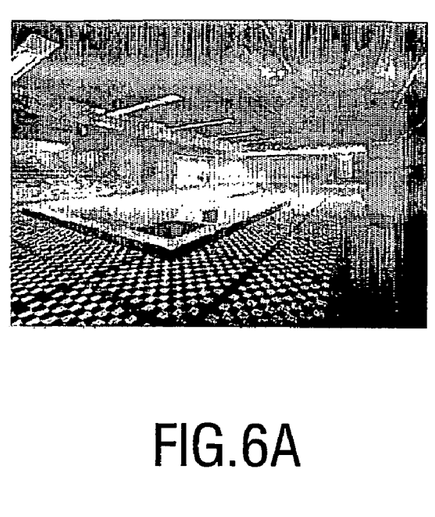
FIG. 6A shows an image rendered with the known computer graphics processor as shown in FIG. 1.
Figure 6B:
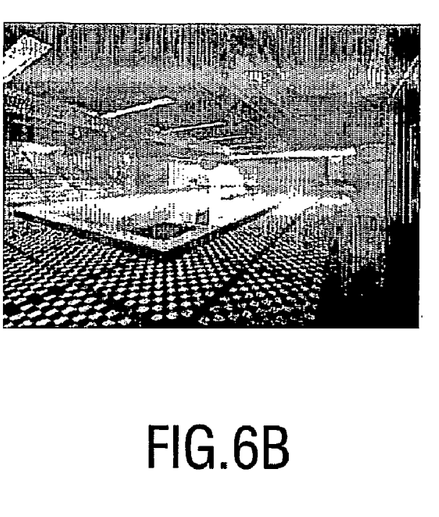
FIG. 6B shows an image rendered with the computer graphics processor according to the invention as shown in FIG. 5.

FIG. 6 shows a comparison of a scene[16] from the game Quake III rendered by a traditional pipeline FIG. 1 and the prototype of the hybrid pipeline FIG. 5. Picture 6a exhibits aliasing for example on the staircase, even though 2×2 multisampling was enabled. In picture 6b, this aliasing is virtually gone, even though the computational and bandwidth costs for generating this picture are roughly the same as for picture 6a. The shadows on the floor and lamp-light on the walls attest to the use of light-maps, which are rendered using the multi texturing "shader" of the prototype of the hybrid pipeline.

REFERENCES

1. Loren Carpenter. The A-buffer, an antialiased hidden surface method. In Hank Christiansen, editor, *Computer Graphics (SIGGRAPH '84 Proceedings)*, volume 18, pages 103-108, July 1984.
2. Edwin Catmull and Alvy Ray Smith. 3-d transformations of images in scan line order. In *Computer Graphics (SIGGRAPH '80 Proceedings)*, volume 14(3), pages 279-285, 1980.
3. Baoquan Chen, Frank Dachille, and Arie Kaufman. Forward image mapping. In *Proceedings of IEEE Visualization '99*, pages 89-96, October 1999.
4. Paul S. Heckbert. Survey of texture mapping. *IEEE Computer Graphics and Applications*, November 1986.
5. Norman P. Jouppi and Chun-Fa Chang. Z3: An economical hardware technique for high-quality antialiasing and transparency. In *Proceedings of Eurographics/Siggraph workshop on graphics hardware 1999*, pages 85-93. ACM Press, 1999.
6. Erick Lindholm, Mark J. Kilgard, and Henry Moreton. A user-programmable vertex engine. In *Proceedings Siggraph 2001*, pages 149-158, August 2001.
7. Koen Meinds. Temporal anti-aliasing with forward texture mapping. In *Submitted to Graphics Hardware 2003*, 2003.
8. Koen Meinds and Bart Barenbrug. Resample hardware for 3d graphics. In T. Ertl, W. Heidrich, and M Doggett, editors, *Proceedings of Graphics Hardware 2002*, pages 17-26, 2002.
9. The resample hardware for 3d graphics webpage at http://www.extra.research.philips.com/graphics/, 2003.
10. The Mesa homepage at http://www.mesa3d.org/.
11. Microsoft. *DirectX Graphics Programmers Guide*. Microsoft Developers Network Library.
12. M. Olano, J. C. Hart, W. Heidrich, and M. McCool. *Real-Time Shading*. A K Peters, Natick, Mass., 2002.
13. M. Olano and A. Lastra. A shading language on graphics hardware: The pixel flow shading system. In *Proceedings Siggraph 1998*, pages 159-168, July 1998.
14. Voicu Popescu, John Eyles, Anselmo Lastra, Joshua Steinhorst, Nick England, and Lars Nyland. The warp engine: An architecture for the post-polygonal age. In *Proceedings Siggraph 2000*, pages 433-442, 2000.
15. Alvy Ray Smith. Planar 2-pass texture mapping and warping. In *Computer Graphics (Proceedings Siggraph 1987)*, volume 21(4), pages 263-272, 1987.
16. Quake III level "Subversive Tendencies" available at http://bettenberg.home.mindspring.com/teqtrny3.html by Tequila, which uses textures maps from http://www.planetquake.com/hfx/ Some of these are replaced, and for some the contrast is increased.
17. George Wolberg and Terrance E. Boult. Separable image warping with spatial lookup tables. In *Computer Graphics (Proc. Siggraph '89)*, volume 23(3), pages 369-378, July 1989.
18. Matthias Zwicker, Hanspeter Pfister, Jeroen van Baar, and Markus Gross. Surface splatting. In *Proceedings Siggraph 2001*, pages 371-378, August 2001.

The invention claimed is:

1. A computer graphics processor comprising a model information providing unit for providing information representing a set of graphics primitives, a rasterizer capable of generating a first sequence of coordinates which coincide with a base grid associated with the primitive, a color generator for assigning a color to said first sequence of coordinates, and a display space resampler for resampling the color assigned by the color generator in the base grid for coordinates u,v to a representation in a grid associated with a display with coordinates x,y, in a first and a second transformation, carried out in a first and a second pass, and optionally including a transposition, The processor having a selection facility for selecting the order of the transformation and selecting whether to apply a transposition or not based on an evaluation of the partial derivates $\partial x/\partial u$, $\partial x/\partial v$, $\partial y/\partial u$, $\partial y/\partial v$, two of which determine shear and two of which determine scaling in the transformations, the selection being made wherein relatively large derivatives occur as scale factors, and relatively small derivatives occur as shear factors and wherein the lowest amount of shear occurs during the second transformation.

2. Computer graphics processor according to claim 1, wherein the rasterizer rasterizes the primitive over a grid in a coordinate system that provides a 2D parameterization of the surface of the primitive.

3. Computer graphics processor according to claim 2, wherein the grid is derived from at least one of several texture maps.

4. Computer graphics processor according to claim 3, wherein, if more than one textures are eligible, the texture is selected with the largest area in texture space.

5. Computer graphics processor according to claim 2, wherein if no texture is associated with the primitive, a dummy grid over the surface of the primitive is chosen, by assigning dummy texture coordinates to each vertex.

6. Method for generating a computer graphics image, comprising the following steps a processor for performing the steps of:
   providing information representing a set of graphics primitives,
   generating a first sequence of coordinates which coincide with a base grid associated with the primitive,
   assigning a color to said first sequence of coordinates using information representing the graphics primitives,
   resampling the color assigned by a color generator in the base grid for coordinates u,v to a representation in a grid associated with a display with coordinates x,y, in a first and a second pass, evaluating the partial derivatives $\partial x/\partial u$, $\partial x/\partial v$, $\partial y/\partial u$, $\partial y/\partial v$, of the coordinates in the display with respect to the coordinates in the base grid, two of which determine shear and two of which determine scaling.

* * * * *